Figure 1:
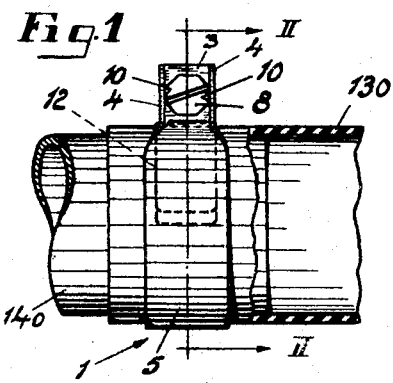

Aug. 18, 1959     S. A. SUNDBERG     2,899,733

HOSE CLAMPS

Filed May 28, 1956

INVENTOR.

BY *Sven Axel Sundberg*
*Peter M. Bousy*
*Atty.*

United States Patent Office 2,899,733
Patented Aug. 18, 1959

2,899,733
HOSE CLAMPS

Sven Axel Sundberg, Nasby Park, Sweden, assignor to Allmänna Brandredskapsaffären AB, Stockholm, Sweden, a corporation of Sweden Application May 28, 1956, Serial No. 587,679

Claims priority, application Sweden May 28, 1955

1 Claim. (Cl. 24—279)

This invention relates to such hose clamps which comprise an annularly bent metal band with almost radially outwards directed ends which are passed through by a screw provided with a head and a nut and which are shaped with angle-bent border flanges serving as enforcements. The head of the screw and the nut, both having a non-circular cross section, are situated between these flanges, which are preferably arranged in such a distance from each other that the nut or the head of the screw is prevented from turning between the flanges.

The object of the present invention is to make it impossible both for the head of the screw and for the nut of hose clamps of this kind to be loosened due to vibrations or something like that.

Trials have been made to prevent the loosening of the hose clamps by means of washers inserted between the ends of the band and the screw or the nut. As the clamp is to be used in connection with hoses of elastic material it is, however, as a rule impossible to obtain the desired locking by means of washers as the locking depends on the elasticity of the hose material. If this material yields the locking effect of the washer will almost get lost.

The above mentioned drawback is eliminated by means of the present invention. The invention is characterised by the fact that at least that end of the metal band whose border flanges do not prevent one part of the screw connection (the nut or the head of the screw) from being turned is provided with means for a releasable locking of the other part of the screw connection. The present invention makes the locking completely independent of the elasticity of the material of the hose.

According to the invention, the above mentioned locking means can be constructed in different ways. According to one embodiment of the invention the releasable locking is obtained by arranging the border flanges on both sides of the head of the screw to press resiliently against the head of the screw when the screw is tightened in order to keep the screw in tightened position by means of the friction caused by the pressing.

Figure 2:
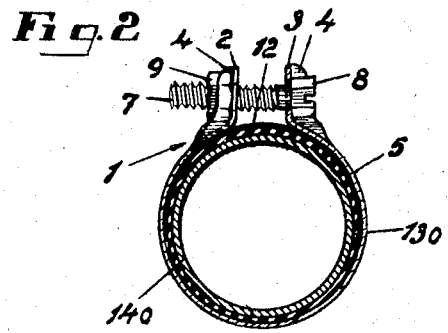
Figure 3:
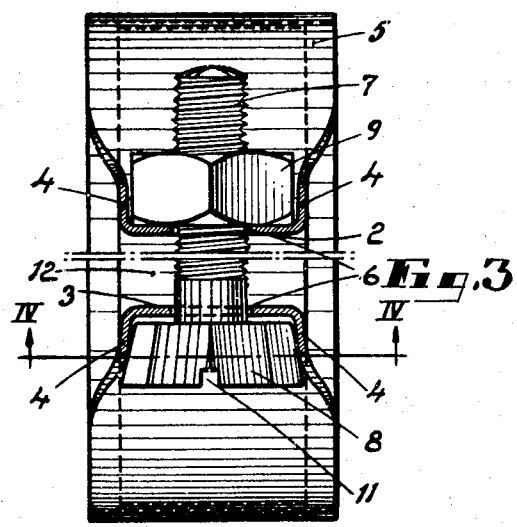
Figure 4:
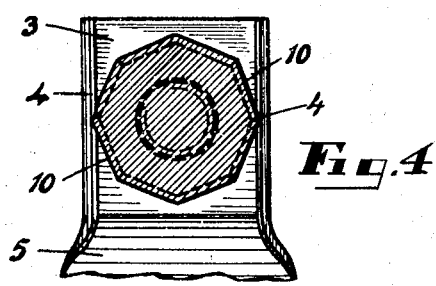

In the following the invention will be elucidated with reference to the accompanying drawing. In the drawing:

Fig. 1 is a side view of a hose clamp according to the invention arranged around a hose on a tube, Fig. 2 is a cross section through the clamp on the line II—II in Fig. 1, Fig. 3 shows on an enlarged scale a partly broken horizontal view of the hose clamp, Fig. 4 shows a cross section through the head of the screw on the line IV—IV in Fig. 3.

In the embodiment shown in the Figs. 1–4 the hose clamp 1 is thought to be manufactured of a strip of stainless steel material, bent to a circular shape with almost radially outwards directed ends 2 and 3. These ends are provided with upwards bent border flanges 4 formed in one piece with the circular part 5 of the clamp and serving as enforcements for the ends 2 and 3. These ends are provided with coaxial holes 6, passed through by a clamping screw 7 which is provided with a head 8 and a nut 9. The border flanges 4 on the end 2 are arranged in a distance from each other which essentially corresponds with the size of jaw of the nut 9. In the shown embodiment the head 8 of the screw is octagonal and conical. The side surfaces 10 of the head 8, which is provided with a chisel groove 11, converge in the direction towards that end of the screw which is provided with the nut. The upwards bent border flanges 4 on the end 3 of the band are arranged in a distance from each other which essentially corresponds with the size of jaw of the head 8 of the screw at the central part of the same. The hose clamp is further in a known way provided with a plate lap 12 which extends over the space between the ends 2 and 3 of the band and which with one end is attached, e.g. by spot welding, to the inside of the annular part 5 of the clamp.

When the end of a hose 130 is put over one end of a tube 140 and after the hose clamp 1 has been adapted around the hose 130 the screw 7 is tightened. At this tightening the border flanges 4 on the end 3 of the band are pressed apart each time the corners between the surfaces 10 on the head 8 pass the flanges 4 (vide Fig. 4). When the screw is tightened so far that the clamp 1 is fixed on the hose 130 and when the screw is tightened to the position of the head 8 shown in Figs. 1 and 2, the screw is effectively kept in tightening position as the flanges 4 will resiliently press against the side surfaces 10 on the head 8 of the screw. There is no risk for the screw or for the nut to be loosened due to vibrations.

The head of the screw may have another non-circular section than the octagonal one. It does not even have to be conical. If a somewhat looser locking will do, the screw head may even have an almost cylindrical shape if only the border flanges 4 are pressed diametrically against the head of the screw with sufficient resilience. In such a case it is preferable to bend the border flanges 4 in such a way that they converge somewhat in the direction from the end 3 of the band and towards that part of the flanges by means of which the latter rest against the head of the screw. The border flanges 4 should have such a height that they will rest with their free edge against the side surfaces of the head of the screw at its outer end when the head of the screw has a conical shape.

What I claim is:

Improvements in hose clamps comprising an annularly bent metal band having substantially radially outwardly bent ends formed with holes therein, a clamping screw passing through said holes and being provided with a head and nut, border flanges bent at an angle upon said ends formed in one piece with said annularly bent metal band to reinforce the corners between the latter and said ends, the head and nut of said clamping screw being of a polygonal cross section and arranged between the border flanges, the flanges situated at the sides of the nut being disposed at such distance from each other as to prevent said nut from turning between them, and the flanges at the sides of the head of the clamping screw being arranged at such distance from each other that by tightening the clamping screw the sides of said flanges will be resiliently pressed apart by said head, whereby to retain the clamping screw in position by means of friction, the head of the clamping screw being conically tapered towards said nut and provided with a groove.

References Cited in the file of this patent

UNITED STATES PATENTS

| | | |
|---|---|---|
| 184,353 | Dull | Nov. 14, 1876 |
| 429,979 | Thum | June 10, 1890 |
| 480,514 | Redfield | Aug. 9, 1892 |
| 524,295 | Gibson | Aug. 7, 1894 |
| 1,356,904 | Bryson | Oct. 26, 1920 |
| 1,778,642 | O'Neil | Oct. 14, 1930 |
| 2,090,374 | Olson | Aug. 17, 1937 |
| 2,651,094 | Dodge | Sept. 8, 1953 |